UNITED STATES PATENT OFFICE.

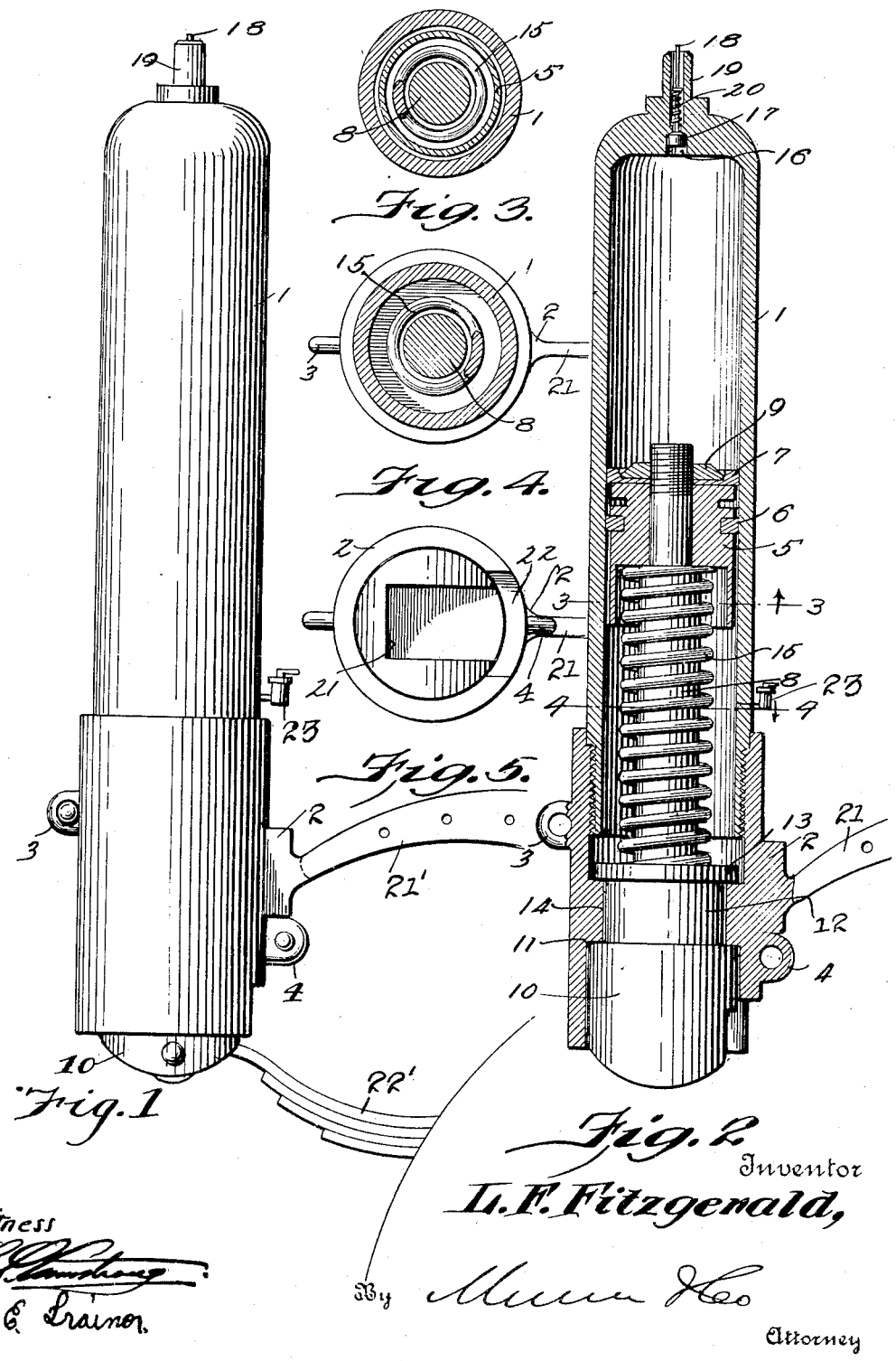

LEO FURGISON FITZGERALD, OF OILFIELDS, CALIFORNIA.

SHOCK-ABSORBER.

1,383,094.      Specification of Letters Patent.     Patented June 28, 1921.

Application filed June 1, 1920. Serial No. 385,861.

*To all whom it may concern:*

Be it known that I, LEO FURGISON FITZGERALD, a citizen of the United States, and a resident of Oilfields, in the county of Fresno and State of California, have invented certain new and useful Improvements in Shock-Absorbers, of which the following is a specification.

My invention is an improvement in shock absorbers, and has for its object to provide a device of the character specified adapted for use with motor vehicles and designed to act as a resilient load carrier and as a snubber for cushioning the recoil.

In the drawings:

Figure 1 is a front view of the improved absorber;

Fig. 2 is a longitudinal section;

Figs. 3 and 4 are sections on the lines 3—3 and 4—4, respectively, of Fig. 2;

Fig. 5 is a bottom plan view.

In the present embodiment of the invention a suitable casing is provided, of cylindrical form and consisting of a section or body 1 and a section or cover 2 having threaded engagement with each other. The section 2 has ears 3 and 4 for permitting it to be connected to the vehicle. Within the casing 1—2 there is arranged a plunger or piston 5, having a packing ring 6 and a packing 7 and that end of the plunger adjacent to the section 2 is reamed or counterbored, as shown.

A stem 8 is connected with the plunger, by means of a nut 9, the stem having a reduced threaded portion passing through the plunger and engaged by the nut on the opposite side of the packing 7 from the piston or plunger.

This stem 8 has a head 10 at the end adjacent to the section 2 and this head is in a counterbore 11 in the outer end of the section 2, it being understood that the outer end of this section 2 is open. The stem has a reduced neck 12 between the body portion 8 of the stem and the head, and a washer 13 is arranged on the body of the stem adjacent to the neck. This washer fits in the body of the section 2 and the bore of the said section is reduced at the neck 12 to fit the neck, as indicated at 14.

The washer 13 moves between the end of the section 1 and the shoulder formed between the body of the section 2 and the reduced portion 14 of the bore. A coil spring 15 encircles the stem between the plunger and the washer 13, and it will be noticed, referring to Fig. 2, that the section 1 has at the end remote from the section 2 an outlet port 16 with which coöperates a valve 17. This valve has a stem 18 which has guided movement in an extension 19 from the end of the section 1, and a spring 20 is provided for normally seating the valve, the spring encircling the stem 18 between a stop thereon and a reduced portion in the bore of the extension. This valve permits the free entrance of air when the plunger moves away from the valve, but restricts the outward flow of the air when the plunger moves toward the valve.

Referring to Fig. 4, it will be seen that the outer end of the head 10 is notched or recessed, as shown at 21, for engagement by the frame of the vehicle, and the wall of the section 2 is notched, as indicated at 22, in register with the notch or recess 21. This notch or recess 21 extends to the periphery of the head adjacent to the notch 22, and the notch 22 is of greater width than the notch 21. With this arrangement, when the plunger 5 which is connected to one of the elements to be cushioned moves downwardly, the spring cushions the downward movement. When the plunger moves in the opposite direction the air cushion between the plunger and the inner end of the section 1 cushions the movement.

It will be noticed that the absorber is shown in connection with the frame 21' and the spring 22' of a motor vehicle. The spring is connected with the head 10, and the frame is connected wtih the ears 4. Preferably, the absorbers at the ends of the vehicle are connected by cross members, the said members being connected with the ears 3.

It will be understood that, in practice, the shock absorber and the frame connection may be cast in one piece, or they may be connected by stud bolts, as shown.

I claim:

1. A shock absorber comprising a casing inclusive of upper and lower detachably connected hollow sections, a stem arranged within said casing and having an enlarged head, the bore of said lower section being reduced thereby forming an annular shoulder intermediate the ends of the lower section, the head of said stem being reduced thereby forming an annular shoulder contacting with one side of said first named annular shoulder, a washer surrounding said stem and contacting with the other side of the shoulder of said lower section, a piston mounted on one end of said stem, a coiled spring surrounding said stem and confined between said piston and said washer, and a valve for said casing, said casing and said enlarged head being provided with attaching means.

2. A shock absorber comprising a casing inclusive of upper and lower detachably connected hollow sections, the lower section having its lower end open and provided with a groove in one side wall, a stem arranged within said casing and having an enlarged head, the bore of said lower section being reduced thereby forming an inwardly extending annular shoulder intermediate the ends of the lower section, the head of said stem being reduced thereby forming an annular shoulder contacting with one side of said first named annular shoulder, a washer surrounding said stem, and contacting with the other side of the shoulder of said lower sections, a piston mounted on one end of said stem, a coiled spring surrounding said stem and confined between said pistons and said washer, and a valve for said casing, the lower end of said head being extended beyond the lower end of said casing and provided with a transverse groove registering with the groove in said lower section, the groove in said head being adapted for the reception of the attaching portion of a spring.

LEO FURGISON FITZGERALD.